July 11, 1972 G. OBERSTE-BERGHAUS 3,676,065
METHOD OF MANUFACTURING HIGHLY CONCENTRATED NITRIC ACID
Original Filed Aug. 24, 1967
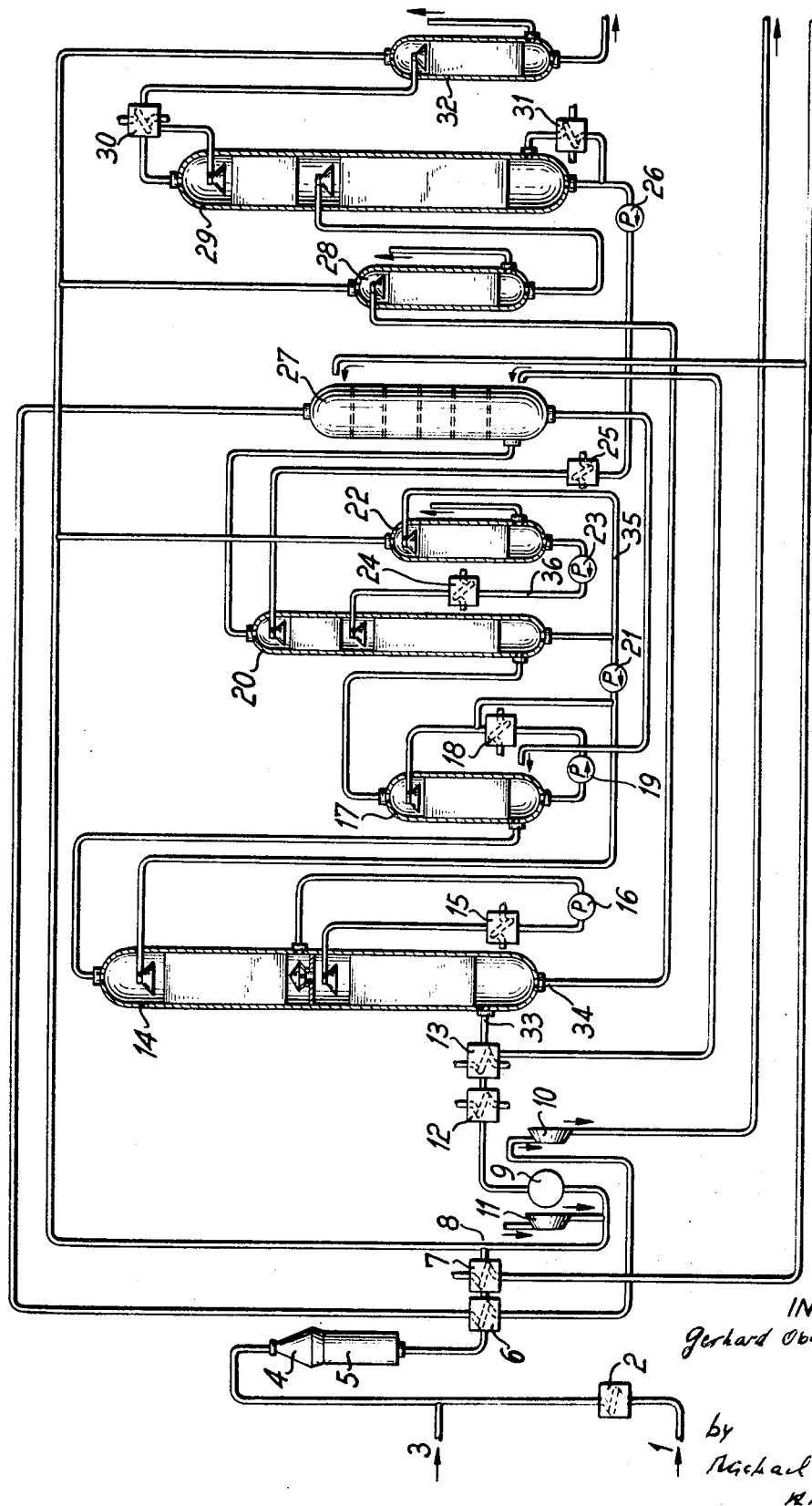
INVENTOR
Gerhard Oberste-Berghaus

United States Patent Office 3,676,065
Patented July 11, 1972

3,676,065
METHOD OF MANUFACTURING HIGHLY CONCENTRATED NITRIC ACID
Gerhard Oberste-Berghaus, Berlin, Germany, assignor to Pintsche Bamag Aktiengesellschaft, Berlin, Germany
Continuation of abandoned applications Ser. No. 834,602, June 9, 1969, and Ser. No. 662,985, Aug. 24, 1967. This application Nov. 16, 1970, Ser. No. 91,608
Claims priority, application Germany, Aug. 30, 1966, P 40,298
Int. Cl. C01b 21/44
U.S. Cl. 23—160                                4 Claims

ABSTRACT OF THE DISCLOSURE

The invention relates to a method of manufacturing highly concentrated nitric acid, wherein dilute nitric acid is concentrated beyond the azeotropic point by chemical absorption of nitrogen dioxide, the product so obtained being subjected to a rectification process.

---

This application is a continuation of application Ser. No. 834,602 filed June 9, 1969 which was a continuation of Ser. No. 662,985 filed Aug. 24, 1967, both now abandoned.

BACKGROUND OF THE INVENTION

The invention relates to a method of manufacturing highly concentrated nitric acid by means of rectification, and more specifically to a method of manufacturing nitric acid concentrated above 98%.

In a known method of this kind, the starting product is dilute nitric acid of 50 to 60% by weight. The weak acid, after addition of an extraction medium, for example sulphuric acid or magnesium nitrate, in order to suppress the azeotropic point, which in the case of $H_2O$-$HNO_3$ mixtures lies at approximately 69% by weight of $HNO_3$, is subjected to an extractive rectification. A nitric acid of approximately 98 to 99% by weight is obtained as head product. The extraction medium is diluted by a quantity of water introduced with the weak acid and by a quantity of condensed steam, which is added by the injection of heating steam necessary from considerations of corrosion; the extraction medium is drawn off at a sump. In a concentration plant, the dilute extraction medium is evaporated back to its initial concentration and is fed to the weak acid at the entrance of the installation. Disadvantages of this method are mainly the high costs of reconcentrating the extraction medium. Furthermore the maintenance costs for such an installation are high since the materials are strongly attacked by corrosion. Considerable losses of extraction medium also occur which are due to this corrosion.

It is an object of this invention to remove or, at least, to decrease these disadvantages.

SUMMARY OF THE INVENTION

A method according to the invention is characterized in that dilute nitric acid is concentrated beyond the azeotropic point by chemical absorption of nitrogen dioxide, and the product is subjected to the rectification process.

From another aspect, the invention consists in the combination of an absorption process, by which the concentration of the nitric acid is increased beyond the azeotropic point, with a rectification process, by which the super-azeotropic nitric acid is separated into high-percentage nitric acid and nitric acid of azeotropic composition.

In contradistinction to the known method, the method of this invention does not require an extraction medium for the rectification process. Thus, costs for reconcentrating the extraction medium and for erecting a reconcentration plant may be avoided. A further advantage of the method of the invention resides in the fact that the above-mentioned material problems are no longer encountered and the maintenance of the installation is thereby simplified.

According to the invention it is advantageous for the absorption process to be performed with azeotropic acid produced in the rectification process, together with a quantity of acid which takes into account the balance of quantities and which is produced in other method stages.

A further development of the invention consists in that the nitrogen dioxide obtained at the end of an absorption column is totally or partially reintroduced into the stream of nitrogen dioxide at the beginning of the absorption column, so that a specific quantity of nitrogen dioxide is circulated through the absorption zone. Thereby, the partial pressure of nitrogen dioxide over the total range of absorption is kept so high, with corresponding compression of the nitrous gases, that concentrating the acid is possible in an economical manner.

The nitrogen dioxide circulation mentioned is produced, according to the invention, by physically absorbing the nitrogen dioxide obtained at the end of the absorption column by high-percentage nitric acid, for example azeotropic acid, blowing out the nitrogen dioxide of the latter by air and feeding it with the air to a stream of nitrogen dioxide in front of the absorption column, and more specifically in front of a condensing apparatus preceding the absorption column.

BRIEF DESCRIPTION OF THE DRAWING

To make the invention clearly understood reference will now be made to the accompanying drawing which is given by way of example and which diagramatically illustrates an embodiment of the invention.

DESCRIPTION OF THE PREFERRED EMBODIMENT

In the embodiment illustrated, nitric oxide is produced in known manner from ammonia and air on platinum rhodium catalysts at a temperature of approximately 800 to 900° C., under atmospheric pressure or a slight excess pressure. The ammonia so produced is fed at 1 to a vaporizer 2 in which in which it is vaporized. Air required for combustion is sucked in at 3. The ammonia-air mixture so obtained passes into a combustion member 4, in which the ammonia is converted on platinum rhodium catalysts to nitrogen monoxide. In order to dissipate reaction heat, the combustion gas passes next through a waste-heat boiler 5, a final gas preheater 6, and a gas cooler-condenser 7. In the gas cooler-condenser 7, the major portion of combustion water is precipitated while 2 to 3% nitric acid is being formed. Since the quantity of combustion water together with water introduced into the installation with air is greater than the quantity of water required for the formation of the product acid, a corresponding part of the 2 to 3% condensate has to be drained off. After the addition at 8 of secondary air charged with nitrogen oxides (see below), the combustion gas is condensed in a nitrous gas compressor 9. The drive of the compressor 9 is effected by an expansion turbine 10 in which the final gases preheated in the preheater 6 are expanded. An additional power is created by a steam turbine 11 which is fed partly with extraneous steam and partly with steam generated in the waste-heat boiler 5. It is recommended to construct the steam turbine 11 as a condensation tapped steam turbine, in which case the tapped steam can be utilized to heat a rectification column. Thereby, a reduction of steam consumption of the installation may be achieved. For dissipating the heat of compression and the reaction heat generated by the oxidation of nitrogen monoxide to nitrogen dioxide, the nitrous gases are passed through a feed water pre-heater 12 and a gas cooler condenser 13.

The nitrous gas mixture arriving behind the condenser 13, which is virtually anhydrous, and in which almost all the nitrogen monoxide has been converted to nitrogen dioxide (or tetroxide) owing to the high pressure, next passes into an absorption region, which is divided into four zones:

(1) Concentration zone

The first zone is a concentration zone and essentially comprises a column 14. In the column 14, the acid run off from a rectification column 29, together with an additional quantity of acid which is obtained partly as condensate in the gas cooler condenser 13 and partly arrives from a final absorption column 27 after it has passed through a condensate concentration tower 17, is concentrated by chemical absorption of nitrogen dioxide fom approximately azeotropic point, that is to say, to the entry concentration for the rectification column 29 (for example 72 to 75% by weight). The added quantity of acid is such that it contains just the quantity of water (water of dilution and water consumed for acid formation) which is contained in the product acid.

The concentration zone may be constructed as a column packed with filling bodies. Gas and acid flow through the column is countercurrent in such a manner that acid trickles downwards from the top to meet the gas rising upwards from the bottom. In order to dissipate the reaction heat, the column of filling bodies is subdivided into a plurality of stages, after which the acid is passed each time by means of pump 16 through external coolers 15 and is then fed to the next stage. Alternatively or additionally, heat may be dissipated within the column, for example, by cooling coils provided on sieve plates. For this zone it is recommended to utilize the refrigeration effect caused by the ammonia vaporization.

Nitrogen dioxide arriving at 33 passes from the bottom upwards through the column 14. Nitric acid flows to meet the gas and is there by gradually concentrated. Super-azeotropic acid is discharged at 34 and passes first through a degassing tower 28, in which dissolved nitrogen dioxide (or tetroxide) is blown out of it by air of normal pressure, whereupon the super-azeotropic acid passes into the rectification column 29.

(2) Condensate concentration zone

The second zone is a condensate concentration zone formed essentially by the tower 17 in which higher-percentage acid condensates (concentration approximately 30 to 40%) obtained after condensation of the nitrous gases in the gas cooler condenser 13, and acid discharged from an absorption stage 27, are concentrated to approximately azeotropic composition by chemical absorption of nitrogen dioxide. This may be also effected in columns packed with filling bodies. A part of the acid is passed by means of a pump 19 in a closed circuit through an external cooler 18 for dissipating heat of reaction.

(3) Physical absorption zone

The third zone is a physical absorption zone formed essentially by a tower 20. Gases coming from the condensate concentration tower 17 still contain substantial quantities of nitrogen dioxide which are no longer utilized for forming acid, and which are washed out in the tower 20 by high-percentage acid (for example azeotropic acid) under release of tetroxide. In order to achieve as complete a washing out as possible, acid discharged from the rectification column 29, which is practically free of dissolved nitrogen oxides, is fed into the tower 20. After charging, this acid passes into the concentration zone in the tower 14, after which dissolved nitorgen oxides are blown out by secondary air in the degassing tower 28. However, acid is additionally circulated through the physical absorption zone in the tower 20 in such a manner that after the acid has been charged with tetroxide it is passed through a pipe 35 to a degassing tower 22 from which the nitrous gas is blown out by secondary air at normal pressure. After cooling in a cooler 24, the circulated acid is fed through a pump 23 into the physical absorption zone in the tower 20 at 36. Tetroxide blown out is fed to the nitrous gas stream together with secondary air before compression at 8. The heat of compression of the nitrous gases may be utilized for preheating the circulated acid to obtain thorough degassing.

The exchange of material between gas and liquid may be performed in columns, packed with filling bodies, the acid being passed through external coolers after each stage to dissipate the heat of reaction.

The absorption tower 20, the degassing tower 22 and the degassing tower 28, in which the super-azeotropic acid discharged from the concentration column 14 is degassed, serve the function to circulate a part of the nitrogen dioxides during the process through the concentration column 14. Thereby sufficiently high partial pressures of nitrogen dioxide are obtained in the entire concentration zone column 14, making it possible to bring a relatively large quantity of approximately azeotropic acid discharged to the super-azeotropic feed concentration.

The washing-out of tetroxide by higher-percentage nitric acid is utilized to keep high (for example not to allow it to fall below 0.5 atm.), the partial pressure of nitrogen dioxide in the centration zone, and thus to a large quantity of super-azeotropic acid, economically. In this manner, concentration differences of 5 to 7% by weight between acid fed to and acid discharged from the rectification column 29 can be obtained, so that requirement of heating steam is very small since only a low return flow ratio is required.

(4) Final absorption zone

The final absorption zone essentially comprises the absorption stage 27. In this zone, the acid vapours remaining in the gas after the physical absorption zone tower 20 are washed out from contact with the high-percentage acid; also the residual nitrogen oxides are washed out down to the admissible residual content.

Water is fed in the form of the 2 to 3% condensate which is obtained in the first condenser 7 and which is required for the formation of the produced acid in addition to the water contained in the stronger condensates.

The final absorption may be performed in a plate-type column. Since the quantity of condensate fed is comparatively small and undergoes strong concentration, there is thus always a steep driving gradient betwen gas and acid.

The residual gas leaving the final absorption zone stage 27 is preheated by the reaction gases in the final gas preheater 6 and is expanded in the expansion turbine 10, which drives the nitrous gas compressor 9. The residual gas then passes into the atmosphere. The residual power for driving the compressor is supplied by an electric motor or the steam turbine 11.

It follows from a quantitative consideration that the major part of the nitrogen dioxide, which is introduced into the installation during the conversion of ammonia on platinum rhodium catalyst, is absorbed during the concentration of the acid fed for rectification, and that in comparison therewith the amount of nitrogen dioxide for concentrating to azeotropic composition, the additional quantity of acid necessary for the standpoint of the balance of quantities is negligibly small.

The acid discharged from the concentration zone at 34 is fed, into the rectification column 29 after degassing in the degassing tower 28. The column 29 comprises a concentrating part and a separating part. As head product, gaseous highly concentrated nitric acid is given off, which is precipitated in a condenser 30 and is partly returned as reflux into the column 29, and partly passed as product acid into a degassing column 32. In the degassing column 32, the residual dissolved nitrogen oxides are blown out by air and fed at 8 to the nitrous gas stream on the suction side of the compressor 9. The finished acid is drawn off from the sump of the degassing column 32.

The run-off from the rectification column 29 consists of approximately azeotropic acid which, after cooling in a cooler 25, is first fed through a pump 26 into the physical absorption zone, tower 20, and after being charged with tetroxide flows into the concentration zone column 14.

The heating of the rectification column 29 is effected by means of steam (for example steam tapped off from the steam turbine 11) in an external heating element 31.

The rectification is conveniently performed at a pressure below the normal pressure. This has various advantages: the azeotropic point shifts to lower acid concentrations, that is to say, the concentration difference between fed and discharged acid is increased, and thus, for an equal number of plates, the reflux ratio and the steam consumption are smaller. Furthermore, the equilibrium graph in the McCabe-Tiele diagram shifts to higher steam contents whereby again the reflux ratio and the steam consumption become smaller for an equal number of plates. Finally, the temperature in the column is low, and thereby the danger of corrosion is avoided or, at least, reduced.

The rectification column may be constructed as a column packed with filling bodies, in which case filling bodies suitable for small trickle quantities have to be inserted in the concentrating part. In some circumstances, plate fixtures having a low pressure loss are more favourable in this part.

Since chromium-nickel steels are resistant to nitric acid only up to concentrations below 97% by weight, and aluminium is resistant only at concentrations above 95% by weight, it is advantageous to make the entire rectification column wall of appropriate chromium-nickel steel, which is clad with an aluminum shell in the upper concentrating part.

It may, of course, be convenient to apply the method of the invention for the manufacture of nitric acid of medium concentrations, for example of 75% nitric acid.

It should be clearly understood that the embodiment described and illustrated is given by way of example and that many modifications, omissions and additions are possible without departing from the spirit of this invention.

What is claimed is:

1. The process of making a highly concentrated superazeotropic nitric acid comprising in succession the following steps: (a) passing a current of nitrogen dioxide after addition of air and of recycled nitrogen dioxide into a concentration zone wherein part of the nitrogen dioxide is reacted with aqueous nitric acid and oxygen, thereby forming superazeotropic acid, (b) separating the thusly formed superazeotropic nitric acid in a rectification zone into superazeotropic nitric acid having a higher concentration than reached in step (a) and azeotropic nitric acid; (c) passing the gas emanating from said concentration zone and containing unreacted nitrogen dioxide through a physical absorption zone in countercurrent flow to nitric acid of about azeotropic concentration thereby absorbing the major portion of the residual nitrogen dioxides from said gas; (d) passing part of the thusly charged nitric acid to a degassing zone in countercurrent flow to a stream of air, the said air stripping the nitrogen dioxides from said nitric acid and entraining the nitrogen dioxides in its flow, the nitric acid after leaving said degassing zone and after being substantially freed of nitrogen dioxide being recycled into said physical absorption zone and recharged therein with nitrogen dioxide; and (e) recycling the nitrogen dioxide-air-mixture into the said current of nitrogen dioxide at a point preceding said concentration zone.

2. The process of claim 1 wherein the azeotropic acid from the rectification zone after passing said physical absorption zone and being charged therein with nitrogen tetroxide from said gas is recycled into said concentration zone together with the nitric acid condensate and water resulting from said oxidation of ammonia and subsequent condensation, the amount of water being adjusted to that required to form said superazeotropic acid from nitrogen dioxide.

3. The process of claim 1 wherein the superazeotropic acid from said concentration zone before being fed to the rectification zone is passed to a degassing zone in countercurrent flow to a stream of air, the said air stripping the nitrogen oxides from said superazeotropic acid and entraining the oxides in its flow and recycling the nitrogen oxides-air mixture into said current of nitrogen dioxide at a point preceding said concentration zone.

4. The process of claim 3 wherein the nitrogen dioxide-air mixture from said degassing zone is fed into said current of nitrogen dioxide whereupon the total gas mixture is subjected to compression prior to passing into said concentration zone.

References Cited
UNITED STATES PATENTS

| | | | |
|---|---|---|---|
| 1,324,255 | 12/1919 | Jensen | 23—160 |
| 1,948,968 | 2/1934 | Kramer et al. | 23—160 |
| 2,046,162 | 6/1936 | Handforth et al. | 23—160 |
| 3,099,531 | 7/1963 | Boynton | 23—160 X |
| 2,088,057 | 7/1937 | Handforth | 23—160 |

OSCAR R. VERTIZ, Primary Examiner

G. O. PETERS, Assistant Examiner